(12) United States Patent
Suzuki et al.

(10) Patent No.: US 9,623,756 B2
(45) Date of Patent: Apr. 18, 2017

(54) POWER CONTROL UNIT

(71) Applicant: HONDA MOTOR CO., LTD., Tokyo (JP)

(72) Inventors: Yuuichi Suzuki, Utsunomiya (JP); Tomoyuki Suzuki, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 436 days.

(21) Appl. No.: 14/358,600

(22) PCT Filed: Oct. 5, 2012

(86) PCT No.: PCT/JP2012/075960
§ 371 (c)(1),
(2) Date: May 15, 2014

(87) PCT Pub. No.: WO2013/080666
PCT Pub. Date: Jun. 6, 2013

(65) Prior Publication Data
US 2014/0319909 A1    Oct. 30, 2014

(30) Foreign Application Priority Data

Nov. 30, 2011  (JP) ................................ 2011-261239

(51) Int. Cl.
*B60L 11/18* (2006.01)
*B60L 3/00* (2006.01)

(52) U.S. Cl.
CPC .......... *B60L 11/1803* (2013.01); *B60L 3/003* (2013.01); *B60L 11/185* (2013.01);
(Continued)

(58) Field of Classification Search
None
See application file for complete search history.

(56) References Cited

U.S. PATENT DOCUMENTS 5,831,409 A * 11/1998 Lindberg ................ B60L 1/003
                                                       180/65.8
2003/0057705 A1   3/2003 Kusumi et al.
(Continued)

FOREIGN PATENT DOCUMENTS

JP        07-075215 A      3/1995
JP        2003-009301 A    1/2003
(Continued)

OTHER PUBLICATIONS

International Search Report, dated Jan. 8, 2013, issued in corresponding application No. PCT/JP2012/075960.
(Continued)

*Primary Examiner* — Jared Fureman
*Assistant Examiner* — Aqeel Bukhari
(74) *Attorney, Agent, or Firm* — Westerman, Hattori, Daniels & Adrian, LLP

(57) ABSTRACT

This power control unit, which stores a power conversion module and a rapid charging device used when charging a battery, is provided with a power conversion chamber, which houses the power conversion module, and a charging device chamber, which houses the charging device, the power conversion chamber and the charging device chamber have a bottom surface in common with each other, the power conversion module and the charging device are affixed to the bottom surface in the respectively corresponding chambers, and an ECU that controls the power conversion module is disposed at a position that is above the charging device and enclosed by a peripheral wall that includes the partition wall that partitions the charging device chamber and the power conversion chamber.

5 Claims, 10 Drawing Sheets

(52) U.S. Cl.
CPC ....... *B60L 11/1805* (2013.01); *B60L 11/1818* (2013.01); *B60L 11/1877* (2013.01); *B60L 2210/10* (2013.01); *B60L 2210/30* (2013.01); *B60L 2240/34* (2013.01); *B60L 2240/36* (2013.01); *B60L 2240/525* (2013.01); *B60L 2240/545* (2013.01); *Y02T 10/705* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | |
|---|---|---|
| 2009/0040724 A1 | 2/2009 | Nishikimi et al. |
| 2009/0213564 A1 | 8/2009 | Kakuda et al. |
| 2010/0025126 A1 | 2/2010 | Nakatsu et al. |
| 2010/0097765 A1 | 4/2010 | Suzuki et al. |
| 2012/0146587 A1* | 6/2012 | Srinivasan ............. H02J 1/108 320/138 |
| 2012/0277942 A1* | 11/2012 | Vilar ..................... B60L 11/005 701/22 |

FOREIGN PATENT DOCUMENTS

| | | |
|---|---|---|
| JP | 2009-044891 A | 2/2009 |
| JP | 2009/201257 A | 9/2009 |
| JP | 2009-295632 A | 12/2009 |
| JP | 2010-035346 A | 2/2010 |
| JP | 2010-035347 A | 2/2010 |

OTHER PUBLICATIONS

Written Opinion, dated Jan. 8, 2013, issued in corresponding application No. PCT/JP2012/075960.

* cited by examiner

POWER CONTROL UNIT

TECHNICAL FIELD

The present invention relates to a power control unit including an electric power converter module having a switching element and configured to convert direct-current power into alternating current and a controller configured to control the electric power converter module, wherein the controller is protected from noise generated by the switching element of the electric power converter module.

BACKGROUND ART

Heretofore, there has been a situation in which noise is produced by the switching element of an inverter circuit and the noise adversely affects a controller for controlling the inverter circuit. Thus, there has been devised a controller layout in view of the adverse effect of the noise produced by the switching element.

Japanese Laid-Open Patent Publication No. 2010-035347 discloses that, in view of noise produced by a power module that includes an inverter circuit (having switching elements), an electric power converter is of a three-layer structure and a control circuit board is disposed on the uppermost layer and isolated by a metal base plate for blocking the noise.

SUMMARY OF INVENTION

According to the technology disclosed in Japanese Laid-Open Patent Publication No. 2010-035347, however, since the casing of the electric power converter is of a three-layer structure for housing the inverter circuit, a controller, etc. therein, the casing is large in size.

It is an object of the present invention to provide a power control unit which reduces the adverse effect of noise produced by an electric power converter module and which can be reduced in size.

According to the present invention, there is provided a power control unit mounted on a vehicle, the power control unit housing therein an electric power converter module and a charging device configured to be used when a battery mounted on the vehicle is charged from an external source, the power control unit including an electric power converter chamber housing the electric power converter module therein, and a charging device chamber housing the charging device therein, wherein the electric power converter chamber and the charging device chamber have a common bottom surface, and the electric power converter module and the charging device are fixed to the bottom surface respectively in the corresponding chambers, the power control unit further including a controller configured to control the electric power converter module, the controller being disposed in a position above the charging device and surrounded by a peripheral wall which includes a partition wall separating the charging device chamber and the electric power converter chamber from each other.

As described above, the power control unit has the electric power converter chamber housing the electric power converter module therein and the charging device chamber housing the charging device therein, and the controller for controlling the electric power converter module is disposed in a position above the charging device and surrounded by the peripheral wall which includes the partition wall that separates the charging device chamber and the electric power converter chamber from each other. Consequently, noise from the electric power converter module is blocked by the partition wall. Therefore, the adverse effect that noise from the electric power converter module may otherwise have on the controller can be reduced. Since the charging device does not operate while the controller is in operation, the controller is not adversely affected by noise from the charging device. On the other hand, while the charging device is in use, the charging device produces noise. However, as the controller is not in operation, there is no need to worry about noise from the charging device.

The electric power converter chamber and the charging device chamber may have respective openings. Therefore, the electric power converter module and the charging device have improved maintainability and can easily be serviced for maintenance.

The controller may be mounted on the peripheral wall. The charging device chamber may be higher than the electric power converter chamber, and the controller may be mounted on the partition wall of the charging device chamber which is disposed in a position higher than the electric power converter chamber. The partition wall effectively blocks noise from the electric power converter module, so that the adverse effect that noise from the electric power converter module may otherwise have on the controller can be further reduced.

The charging device may include a quick charging device and have quick charging contactors.

With the power control unit according to the present invention, noise from the electric power converter module is blocked by the partition wall. Therefore, the adverse effect of noise caused by the electric power converter module on the controller can be reduced. Since the charging device does not operate while the controller is in operation, the controller is not adversely affected by noise from the charging device. On the other hand, while the charging device is in use, the charging device produces noise. However, as the controller is not in operation, there is no need to worry about noise from the charging device.

DESCRIPTION OF EMBODIMENTS

An electric vehicle which has a power control unit according to a preferred embodiment of the present invention will be described in detail below with reference to the accompanying drawings.

Figure 1:
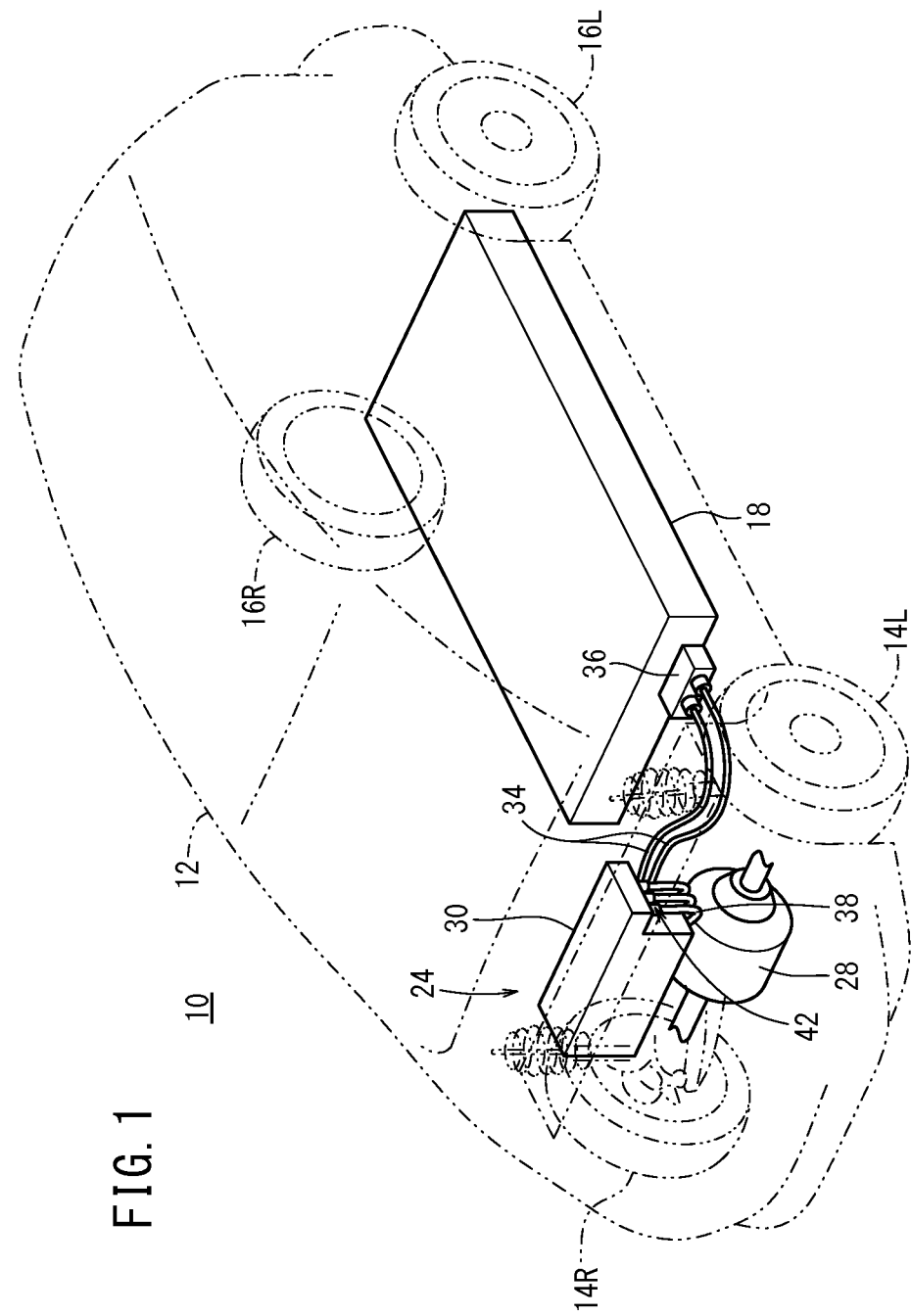
FIG. 1 is a perspective view schematically showing a general arrangement of an electric vehicle according to an embodiment of the present invention.
Figure 2:
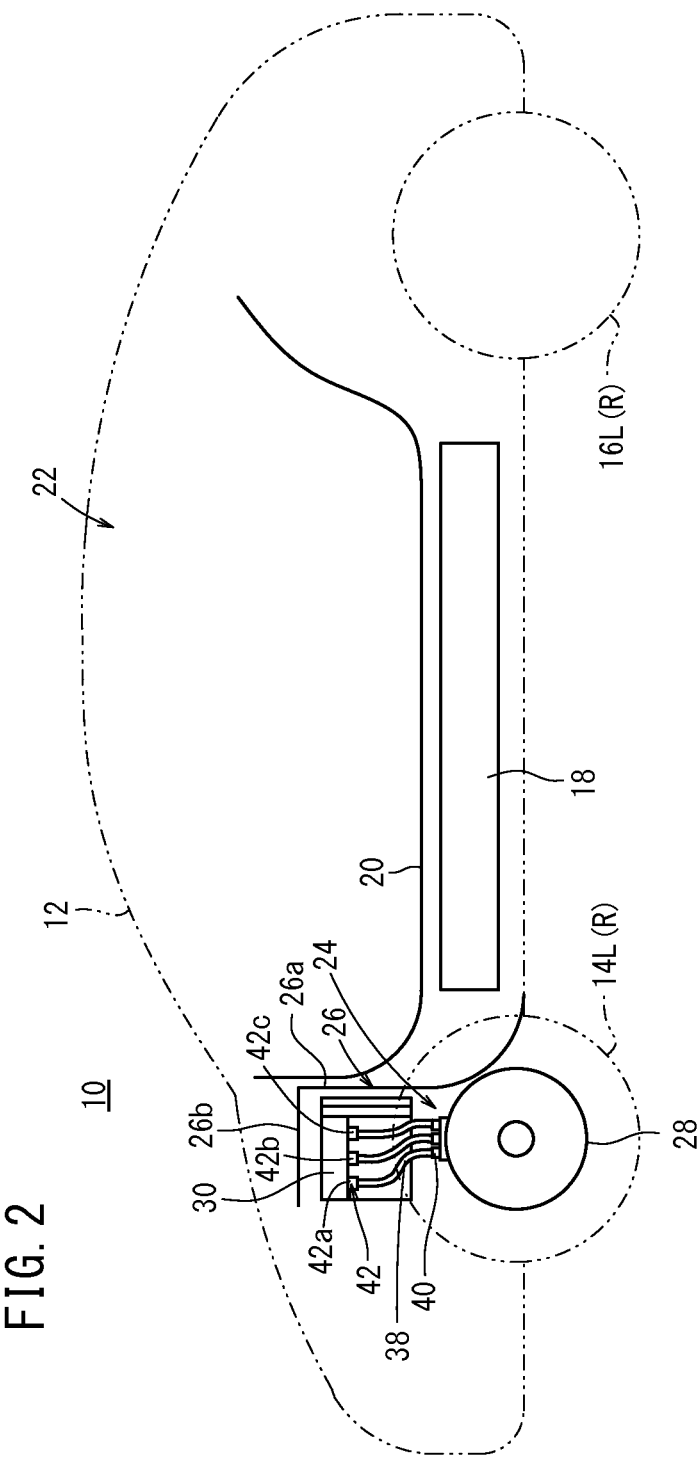
FIG. 2 is a side elevational view schematically showing the general arrangement of the electric vehicle according to the embodiment.

FIG. 1 is a perspective view schematically showing a general arrangement of an electric vehicle (vehicle) 10, and FIG. 2 is a side elevational view schematically showing the general arrangement of the electric vehicle 10. In the present embodiment, the vertical directions of a vehicle body 12 of the electric vehicle 10 are referred to as up and down directions, and directions perpendicular to the vertical directions are referred to as horizontal directions. The direction in which the electric vehicle 10 travels forwardly is referred to as a forward direction, and the direction in which the electric vehicle 10 reverses is referred to as a rearward direction. Further, the direction on the left side as viewed along the forward direction is referred to as a leftward direction, and the direction on the right side as viewed along the forward direction is referred to as a rightward direction.

The electric vehicle 10 has, housed in the vehicle body 12, a battery 18 for outputting a high voltage, disposed on the bottom of the vehicle body 12 between front wheels 14L, 14R and rear wheels 16L, 16R, a passenger compartment 22 defined above the battery 18 with a floor panel 20 interposed therebetween, a motor room 24 defined in a front area of the vehicle body 12 and isolated from the passenger compartment 22, a dash panel 26 covering the motor room 24, and a power control unit 30 disposed below the dash panel 26 and placed above a traction motor 28 that is disposed in the motor room 24. The dash panel 26 has a lower dash panel member 26a and an upper dash panel member 26b. The dash panel 26 serves to separate the motor room 24 and the passenger compartment 22 from each other and has a structure for preventing the entry of dirt, water, odor, etc. from the motor room 24. The dash panel 26 also has a water discharging function to prevent external water from flowing into A/C (air conditioner) pipes.

Power supply cables 34 serve to transmit electric power stored in the battery 18 to the power control unit 30. The power supply cables 34 have ends connected to a power supply connector 36 of the battery 18 and other ends connected to power supply connectors 94 (see FIG. 7) of the power control unit 30. The power control unit 30 converts DC electric power from the battery 18 into three-phase (U, V, W phases) AC electric power, and supplies the three-phase AC electric power to the traction motor 28 thereby to energize the traction motor 28.

The power control unit 30 has an electric power converter module 60 (see FIGS. 4, 5, 7) for converting direct-current electric power into three-phase alternating current, and an ECU 70 (see FIGS. 4, 7, 9) for controlling the electric power converter module 60 to energize the traction motor 28. The traction motor 28 and the power control unit 30 are connected to each other by three-phase AC electric power cables (electric power supply lines) 38, which have ends connected to electric power connectors 40 of the traction motor 28 and other ends connected to electric power connectors 42 (electric power connectors 42a, 42b, 42c) of the power control unit 30. Since the power control unit 30 is disposed above the traction motor 28, the high-voltage three-phase AC electric power cables 38 can be shortened.

Figure 3:
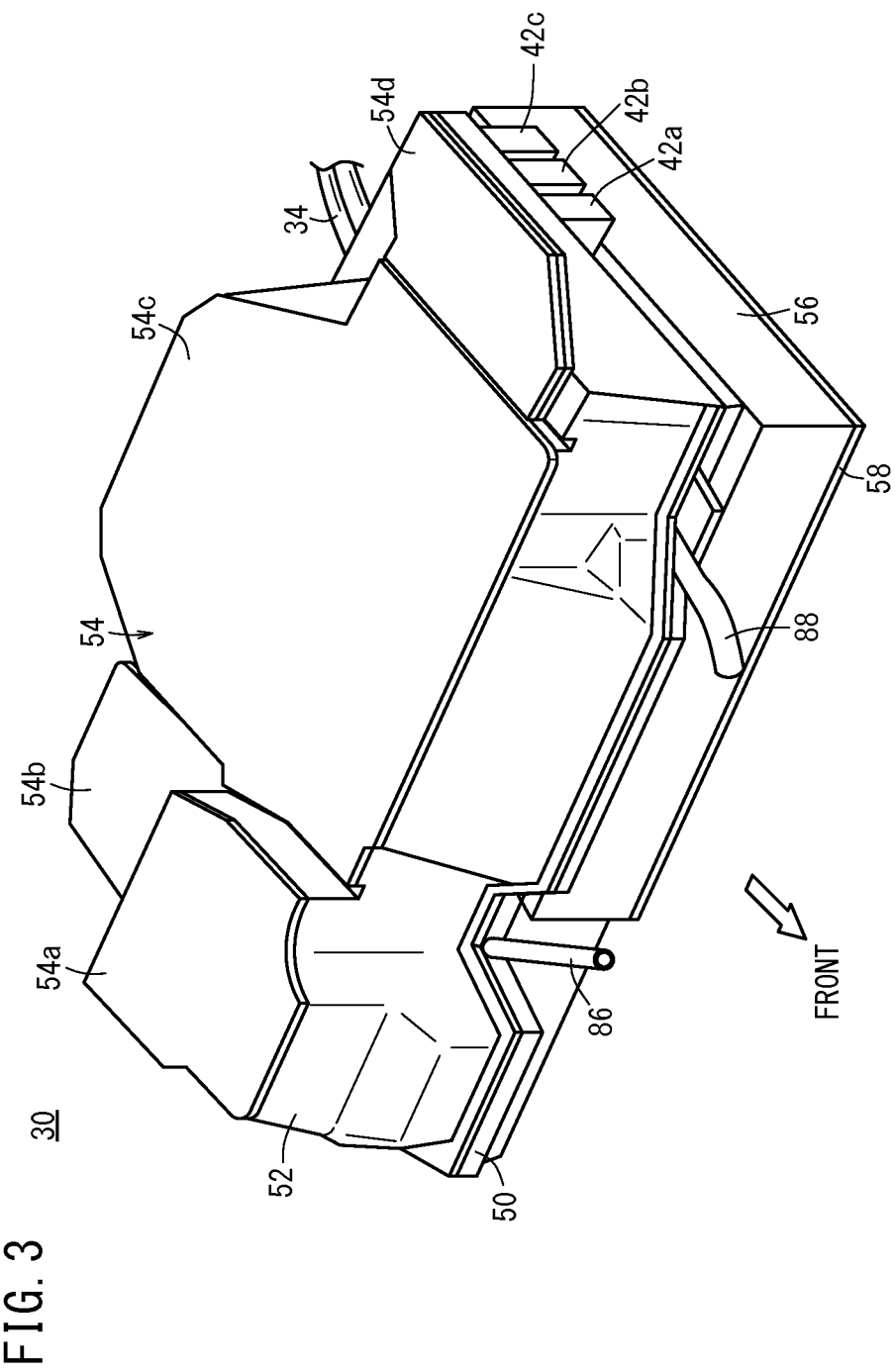
FIG. 3 is a perspective view of a power control unit shown in FIG. 1.
Figure 4:
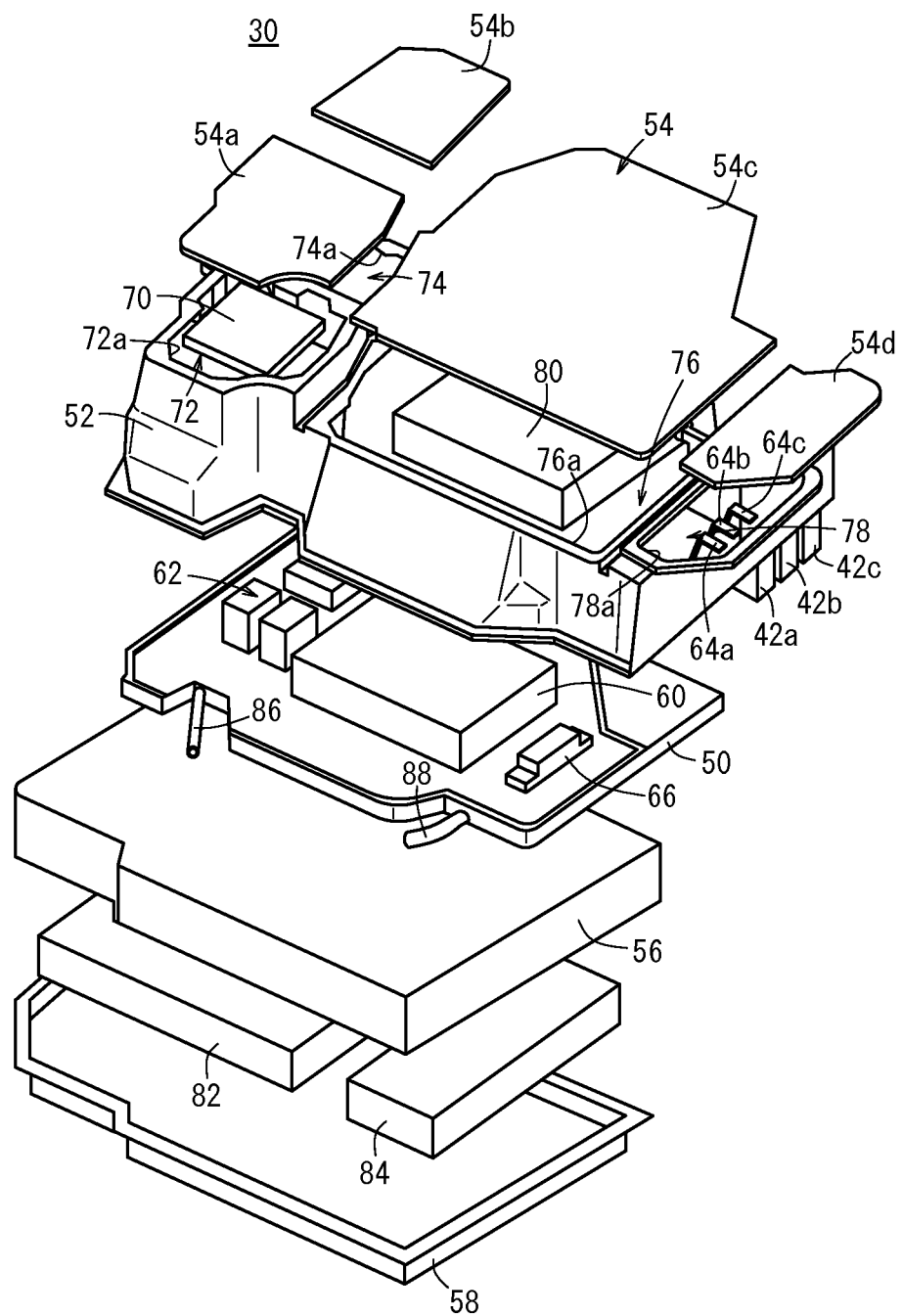
FIG. 4 is an exploded perspective view of the power control unit shown in FIG. 3.

FIG. 3 shows the power control unit 30 in perspective, and FIG. 4 shows the power control unit 30 in exploded perspective. The power control unit 30 includes a heat sink 50, an upper case 52 mounted on an upper portion of the heat sink 50, an upper cover 54 covering an upper portion of the upper case 52, a lower case 56 mounted on a lower portion of the heat sink 50, and a lower cover 58 covering a lower portion of the lower case 56. Of the heat sink 50, the upper case 52, the upper cover 54, the lower case 56, and the lower cover 58, at least the upper case 52 is made of metal such as aluminum or the like. The heat sink 50, the upper case 52, the upper cover 54, the lower case 56, and the lower cover 58 jointly make up a casing of the power control unit 30.

The electric power converter module 60 is disposed substantially centrally on the upper surface of the heat sink 50. A quick charging device (charging device) 62 for use in charging the battery 18 from an external source, fuses 98a, 98b (see FIGS. 5, 7), etc. are disposed on a right region of the upper surface of the heat sink 50. Three-phase terminals 64a, 64b, 64c that interconnect the electric power converter module 60 and the electric power connectors 42a, 42b, 42c on the upper case 52 are disposed upwardly of a left region of the heat sink 50. The electric power converter module 60 converts DC electric power from the battery 18 into AC electric power in three phases (U, V, W phases), and supplies the AC electric power in the three phases to the respective three-phase terminals 64a, 64b, 64c. The three-phase terminals 64a, 64b, 64c have respective middle portions which are supported on a three-phase terminal base 66 mounted on the left region of the upper surface of the heat sink 50.

The electric power converter module 60 comprises a switching module having a plurality of switching elements, the switching module being housed in the casing. When the switching elements are turned on and off, the electric power converter module 60 converts the DC electric power from the battery 18 into the three-phase AC electric power, or converts three-phase AC electric power from the traction motor 28 into DC electric power.

The heat sink 50 and the upper case 52 jointly make up a charging device chamber 72 housing the quick charging device 62 therein, a fuse chamber 74 housing the fuses 98a, 98b therein, an electric power converter chamber 76 housing the electric power converter module 60 therein, and a three-phase terminal chamber 78 housing the three-phase terminals 64a, 64b, 64c therein. The charging device chamber 72 has a first opening 72a defined in the upper surface of the upper case 52 for providing access into the charging device chamber 72. The fuse chamber 74 has a second opening 74a defined in the upper surface of the upper case 52 for providing access into the fuse chamber 74. The electric power converter chamber 76 has a third opening 76a defined in the upper surface of the upper case 52 for providing access into the electric power converter chamber 76. The three-phase terminal chamber 78 has a fourth opening 78a defined in the upper surface of the upper case 52 for providing access into the three-phase terminal chamber 78 (see FIGS. 4, 8). The ECU (controller) 70 for controlling the electric power converter module 60 is disposed in the charging device chamber 72 above the quick charging device 62.

The upper cover 54 has a first upper cover 54a covering the first opening 72a, a second upper cover 54b covering the second opening 74a, a third upper cover 54c covering the third opening 76a, and a fourth upper cover 54d covering the fourth opening 78a. The charging device chamber 72 is higher than the fuse chamber 74, the electric power converter chamber 76, and the three-phase terminal chamber 78. Therefore, the first opening 72a is in a position higher than the second through fourth openings 74a through 78a.

A capacitor module 80 having a smoothing capacitor 96 (see FIG. 7) is suspended from an inner wall surface of the upper case 52 above the electric power converter module 60 and below the third opening 76a. The smoothing capacitor 96, which is electrically connected to the electric power converter module 60, serves to smooth electric power from the battery 18. The capacitor module 80 includes a housing that houses the smoothing capacitor 96.

The lower case 56 has a bottom surface on which there are disposed a charger 82 for charging the battery 18 and a DC/DC converter 84 for stepping down the voltage of the battery 18 to supply low-voltage electric power to devices (electric components) of a low-voltage system on the electric vehicle 10. The DC/DC converter 84 and the charger 82 are housed in respective rectangular housings. The charger 82 has more parts than the DC/DC converter 84, and thus tends to be large in size. Thus, the housing that houses the charger 82 is larger than the housing that houses the DC/DC converter 84.

The heat sink 50 has an inlet port 86 through which a fluid flows in and an outlet port 88 through which a fluid flows out. A bottom surface of the heat sink 50 and an upper surface of the lower case 56 jointly define a fluid channel, not shown, through which the fluid flows. The fluid that has flowed in through the inlet port 86 flows through the fluid channel defined by the heat sink 50 and the lower case 56 and flows out of the outlet port 88. The heat sink 50 thus dissipates heat generated by the electric power converter module 60, and the quick charging device 62, etc. on the upper surface of the heat sink 50, and the charger 82 and the DC/DC converter 84 on the bottom surface of the heat sink 50, thereby cooling these components.

Figure 5:
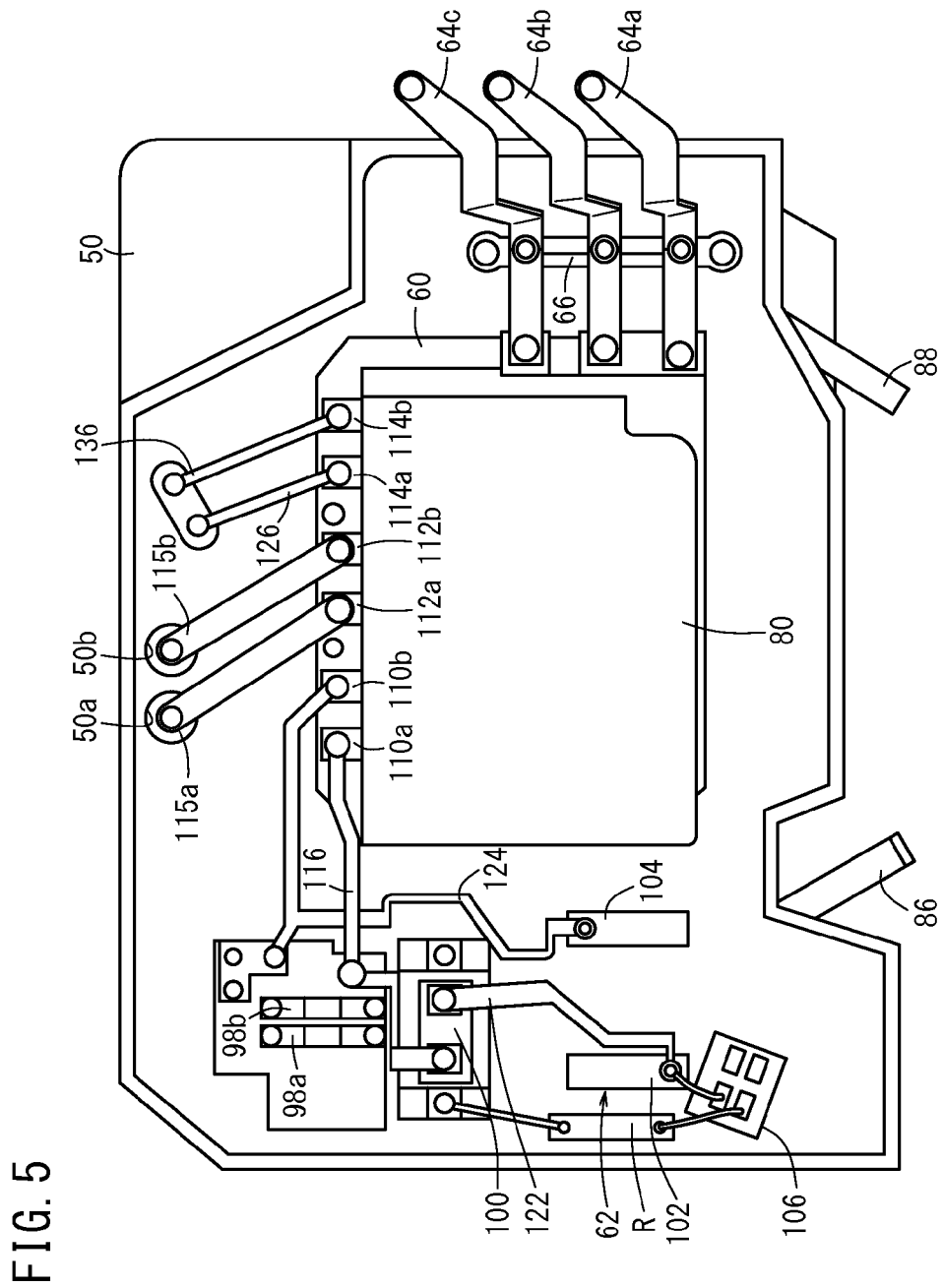
FIG. 5 is a top plan view of a heat sink shown in FIG. 4.
Figure 6:
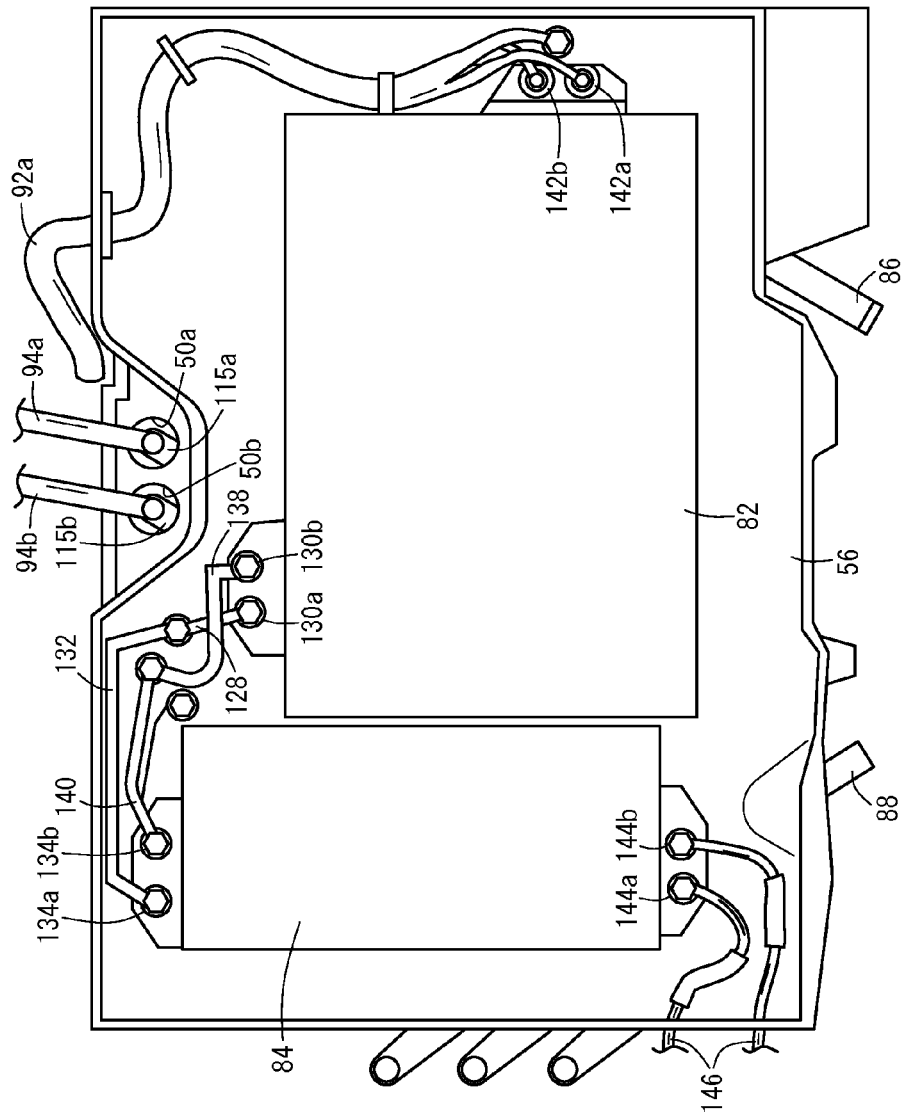
FIG. 6 is a bottom plan view of a lower case shown in FIG. 4.
Figure 7:
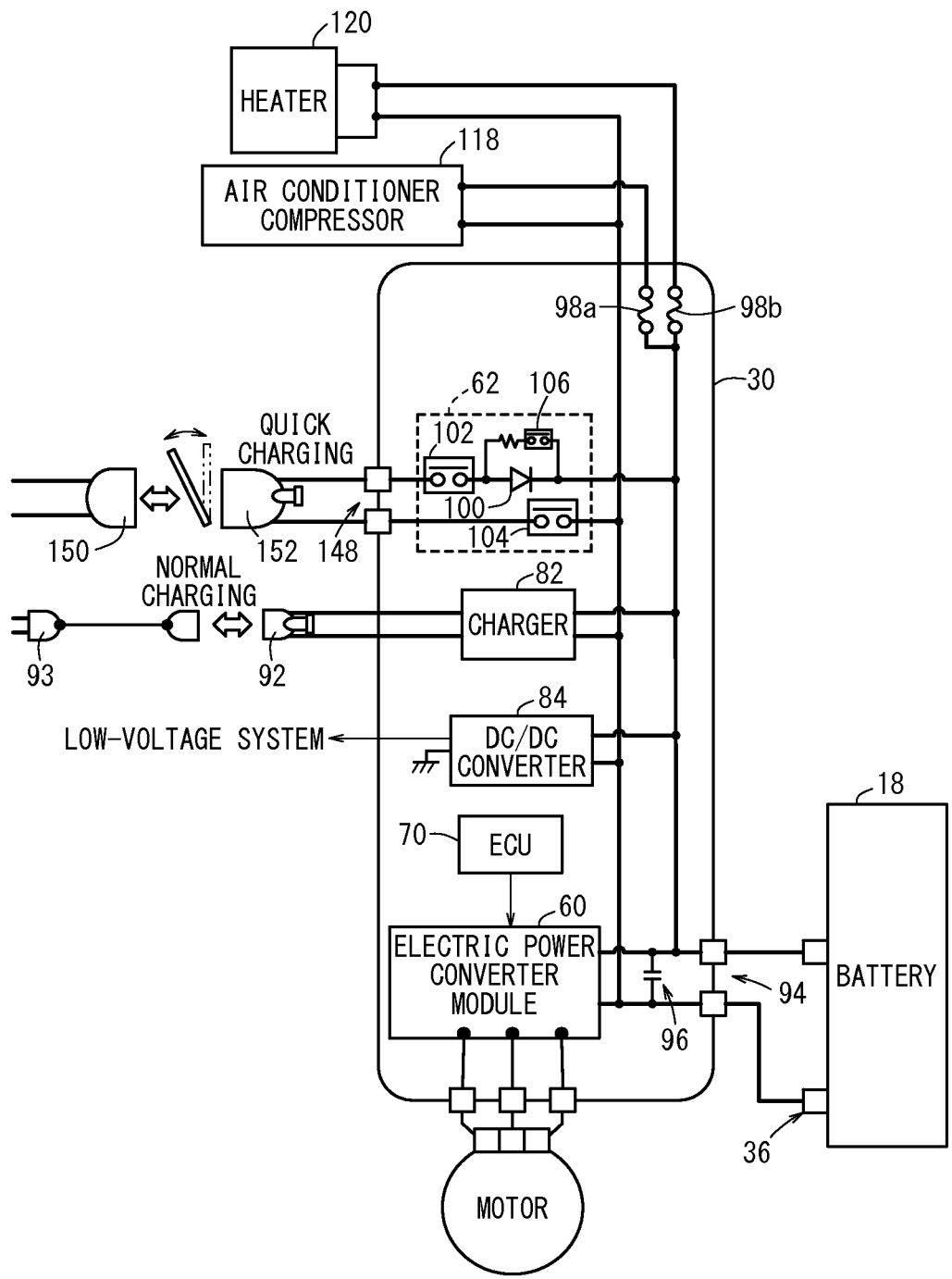
FIG. 7 is a circuit diagram of the power control unit.

FIG. 5 is a top plan view of the heat sink 50, FIG. 6 is a bottom plan view of the lower case 56, and FIG. 7 is a circuit diagram of the power control unit 30.

The electric power converter module 60 is connected to the power supply connectors 94 (see FIG. 7), and the battery 18 is connected to the power supply connectors 94 by the power supply cables 34, thus connecting the electric power converter module 60 to the battery 18. The smoothing capacitor 96 of the capacitor module 80 for smoothing the applied voltage is connected in parallel between the electric power converter module 60 and the battery 18. The capacitor module 80 is electrically connected to the DC/DC converter 84, the charger 82, the quick charging device 62, and the fuses 98a, 98b by bus bars.

The DC/DC converter 84, the charger 82, the quick charging device 62, and the fuses 98a, 98b are thus connected to the battery 18. The bus bars can be blanked out of a metal sheet such as a copper sheet or the like. The quick charging device 62 has a diode (quick charging diode) 100, a first main contactor (first quick charging contactor) 102, a second main contactor (second quick charging contactor) 104, a resistor R, and a pre-contactor 106. Since the high-voltage components (the electric power converter module 60, the DC/DC converter 84, the charger 82, and the quick charging device 62) are housed in one casing, they can be connected by the bus bars without using high-voltage cables, so that the power control unit 30 can be reduced in size and hence in cost.

As shown in FIG. 5, the capacitor module 80 has a first positive terminal 110a, a first negative terminal 110b, a second positive terminal 112a, a second negative terminal 112b, a third positive terminal 114a, and a third negative terminal 114b. The first positive terminal 110a, the second positive terminal 112a, and the third positive terminal 114a are held in electrical conduction with each other, whereas the first negative terminal 110b, the second negative terminal 112b, and the third negative terminal 114b are held in electrical conduction with each other. The second positive terminal 112a and the second negative terminal 112b are connected to the power supply connectors 94 by respective bus bars 115a, 115b and respective power supply cables 94a, 94b (see FIG. 6). Therefore, the second positive terminal 112a is connected to the positive pole of the battery 18, whereas the second negative terminal 112b is connected to the negative pole of the battery 18.

The electric power converter module 60 has a positive connection terminal and a negative connection terminal (connection terminals), not shown, that are connected respectively to the second positive terminal 112a and the second negative terminal 112b. The positive connection terminal of the electric power converter module 60 is connected to the second positive terminal 112a and an end of the bus bar 115a, whereas the negative connection terminal of the electric power converter module 60 is connected to the second negative terminal 112b and an end of the bus bar 115b. The power supply cables 94a, 94b are inserted from below the heat sink 50 through respective through holes 50a, 50b into the power control unit 30 where the power supply cables 94a, 94b are connected to the other ends of the bus bars 115a, 115b, respectively.

The first positive terminal 110a, ends of the fuses 98a, 98b, and the cathode of the diode 100 are connected to each other by a single bus bar 116, so that the bus bar 116 and the battery 18 have the same potential. The other end of the fuse 98a, which is not connected to the first positive terminal 110a, is connected to an air conditioner compressor (compressor for air conditioner) 118, and the other end of the fuse 98b, which is not connected to the first positive terminal 110a, is connected to a heater 120 (see FIG. 7).

The cathode of the diode 100 is connected to an end of the first main contactor 102 through the resistor R and the pre-contactor 106. The anode of the diode 100 is connected to the end of the first main contactor 102 by a bus bar 122. The first negative terminal 110b is connected to an end of the second main contactor 104 by a bus bar 124.

As shown in FIGS. 5 and 6, the third positive terminal 114a is connected to a fourth positive terminal 130a of the charger 82 by bus bars 126, 128 and is also connected to a fifth positive terminal 134a of the DC/DC converter 84 by the bus bar 126 and a bus bar 132. The third negative terminal 114b is connected to a fourth negative terminal 130b of the charger 82 by bus bars 136, 138 and is also connected to a fifth negative terminal 134b of the DC/DC converter 84 by the bus bar 136 and a bus bar 140.

The charger 82 has a sixth positive terminal 142a and a sixth negative terminal 142b that are connected to a connector 92 by cables 92a. The DC/DC converter 84 has a seventh positive terminal 144a and a seventh negative terminal 144b that are connected to cables 146 extending out of the power control unit 30. Electric power having voltage stepped down by the DC/DC converter 84 can be supplied to the devices of the low-voltage system on the electric vehicle 10 by the cables 146.

As shown in FIG. 6, the DC/DC converter 84 and the charger 82 are arranged with their longitudinal axes extending perpendicularly to each other. A long side of the DC/DC converter 84 is adjacent to a short side of the charger 82.

When a plug 93 connected to the connector 92 is coupled to a commercial electric power outlet, 100-V or 200-V AC electric power is supplied to the charger 82, which charges the battery 18 normally (see FIG. 7).

Figure 8:
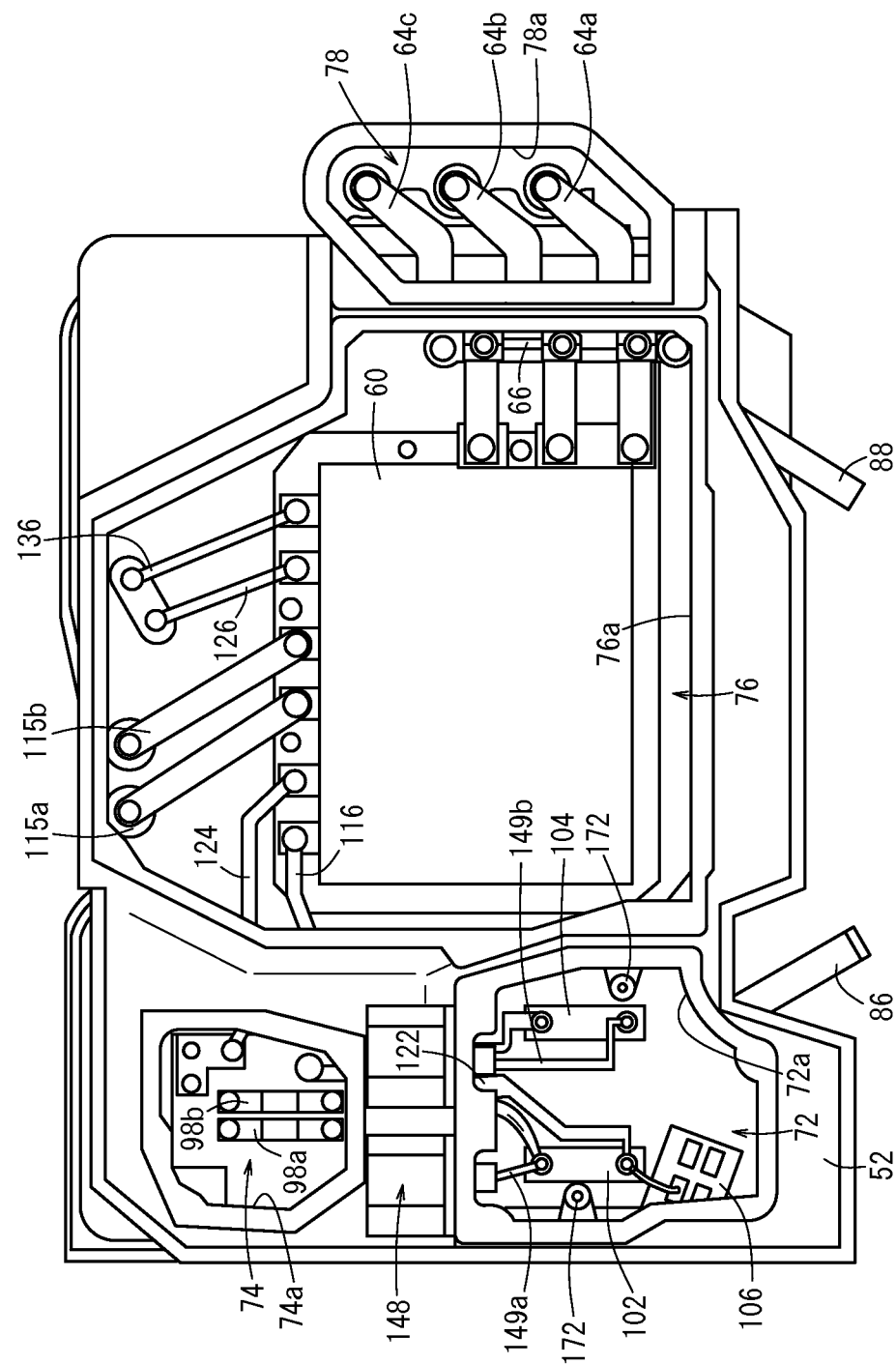
FIG. 8 is a top plan view of the heat sink shown in FIG. 5 with an upper case disposed on an upper portion thereof.

FIG. 8 is a top plan view of the heat sink 50 shown in FIG. 5 with the upper case 52 disposed on an upper portion thereof. In FIG. 8, the capacitor module 80 is omitted from illustration. The upper case 52 has quick charging connectors 148 which are connected respectively to the other end of the first main contactor 102 and the other end of the second main contactor 104 by respective bus bars 149a, 149b. To the quick charging connectors 148, there is connected a connector 152 that can be connected to a charger connector 150 of a quick charger, not shown, for supplying high-voltage DC electric power, which is installed in a service area or a charging station (see FIG. 7). When the charger connector 150 of the quick charger is connected to the connector 152, the quick charger charges the battery 18 quickly.

Figure 9:
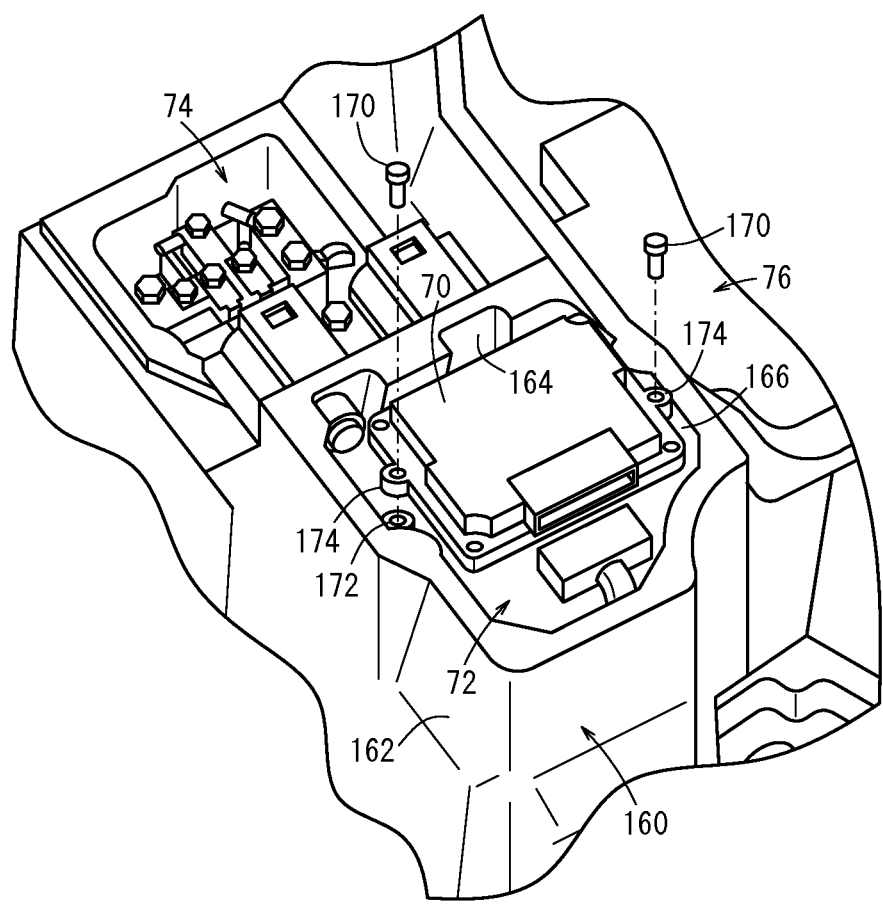
FIG. 9 is a view illustrating the manner in which an ECU is installed in a charging device chamber.
Figure 10:
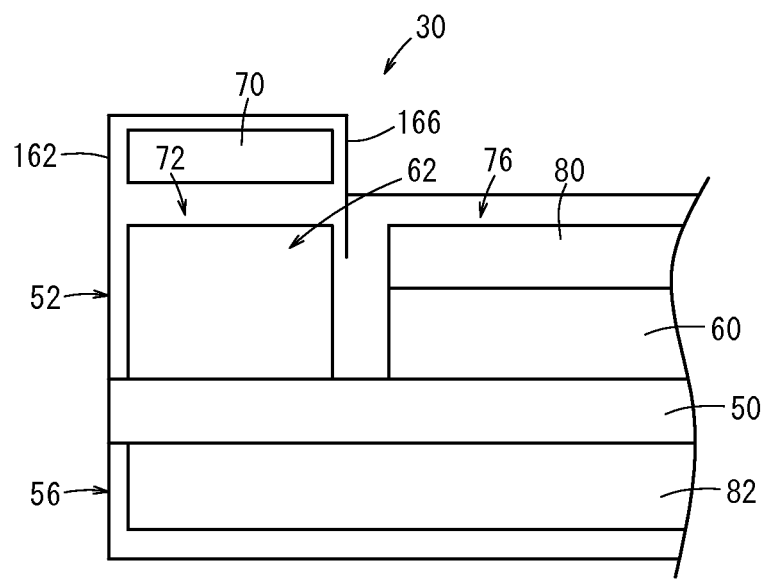
FIG. 10 is a fragmentary cross-sectional view of the power control unit with the ECU installed therein.

FIG. 9 illustrates the manner in which the ECU 70 is installed in the charging device chamber 72. FIG. 10 shows in fragmentary cross section the power control unit 30 with the ECU 70 installed therein. The charging device chamber 72 is surrounded by a peripheral wall 160 that is made up of an outer peripheral wall 162 of the upper case 52, a partition wall 164 separating the charging device chamber 72 and the fuse chamber 74 from each other, and a partition wall 166 separating the charging device chamber 72 and the electric power converter chamber 76 from each other. At least a portion of the partition walls 164, 166 performs a function as an outer wall of the upper case 52, and is made of metal such as aluminum or the like. As the ECU 70 is mounted on the peripheral wall 160 of the charging device chamber 72 which is disposed in a position higher than the electric power converter chamber 76, the ECU 70 is disposed in a position above the quick charging device 62 and surrounded by the peripheral wall 160. In installation of the ECU 70 in the charging device chamber 72, fastening portions 172, 172 (see FIG. 8) on the partition wall 166 and on the outer peripheral wall 162, which faces the partition wall 166, of the upper case 52 and fastening portions 174, 174 of the ECU 70 are fastened to each other by screws 170, 170 whereby the ECU 70 is installed in the charging device chamber 72.

As shown in FIG. 10, inasmuch as the partition wall 166 is disposed between the ECU 70 and the electric power converter module 60, noise from the electric power converter module 60 is blocked by the partition wall 166 which is made of metal such as aluminum or the like. Therefore, the adverse effect of noise caused by the electric power converter module 60 on the ECU 70 can be reduced. Even though the ECU 70 is disposed above the quick charging device 62, since the quick charging device 62 does not charge the battery 18 while the electric vehicle 10 is traveling, i.e., while the ECU 70 is energizing the traction motor 28, the quick charging device 62 does not produce noise while the ECU 70 is in operation, and hence the ECU 70 is not adversely affected by noise from the quick charging device 62. On the other hand, while the quick charging is being performed, the electric vehicle 10 does not travel (i.e., the ECU 70 is not in operation). Thus, there is no need to worry about noise from the quick charging device 62.

As described above, the power control unit 30 has the electric power converter chamber 76 housing the electric power converter module 60 therein and the charging device chamber 72 housing the quick charging device 62 therein, and the ECU 70 is disposed in a position above the quick charging device 62 and surrounded by the peripheral wall 160 which includes the partition wall 166 that separates the charging device chamber 72 and the electric power converter chamber 76 from each other. Consequently, noise from the electric power converter module 60 is blocked by the partition wall 166. Therefore, the adverse effect that noise from the electric power converter module 60 may otherwise have on the ECU 70 can be reduced. Since the quick charging device 62 does not operate while the ECU 70 is in operation, the ECU 70 is not adversely affected by noise from the quick charging device 62. On the other hand, while the quick charging device is in use, the quick charging device 62 produces noise. However, as the ECU 70 is not in operation, there is no need to worry about noise from the quick charging device 62.

The charging device chamber 72 has the first opening 72*a*, the fuse chamber 74 has the second opening 74*a*, the electric power converter chamber 76 has the third opening 76*a*, and the three-phase terminal chamber 78 has the fourth opening 78*a*. Therefore, the components in these chambers have improved maintainability and can easily be serviced for maintenance.

Furthermore, as the charging device chamber 72 is positioned higher than the electric power converter chamber 76, and the ECU 70 is mouthed on the partition wall 166 of the charging device chamber 72 that is positioned higher than the electric power converter chamber 76, the partition wall 166 effectively blocks noise from the electric power converter module 60, so that the adverse effect that noise from the electric power converter module 60 may otherwise have on the ECU 70 can be further reduced.

Although the preferred embodiment of the present invention has been described above, the technical scope of the present invention is not limited to the scope of the above embodiment. It is obvious to those skilled in the art that various changes or improvements can be made to the above embodiment. It is apparent from the scope of the claims that those changes and improvements will be included in the technical scope of the present invention.

The invention claimed is:

1. A power control unit mounted on a vehicle, the power control unit comprising therein an electric power converter module and a charging device configured to be used when a battery mounted on the vehicle is charged from an external source, the power control unit further comprising:
a case;
an electric power converter chamber disposed in the case and comprising the electric power converter module therein; and
a charging device chamber disposed in the case and comprising the charging device therein,
wherein the case comprises a metal partition wall partitioning the charging device chamber from the electric power converter chamber such that the charging device chamber is separated from the electric power converter chamber,
wherein the electric power converter chamber and the charging device chamber have a common bottom surface, and the electric power converter module and the charging device are fixed to the bottom surface respectively in the corresponding chambers,
the case includes a space above the charging device and the case includes a peripheral wall surrounding the space, the peripheral wall including the partition wall,
the power control unit further comprising a controller configured to control the electric power converter module, the controller being disposed in the space above the charging device,
wherein the charging device does not operate while the controller is in operation and the controller does not operate while the charging device is in operation.

2. The power control unit according to claim 1, wherein the electric power converter chamber and the charging device chamber have respective openings.

3. The power control unit according to claim 1, wherein the controller is mounted on the peripheral wall.

4. The power control unit according to claim 1, wherein the charging device chamber is higher than the electric power converter chamber, and the controller is mounted on the partition wall of the charging device chamber which is disposed in a position higher than the electric power converter chamber.

5. The power control unit according to claim 1, wherein the charging device comprises a quick charging device and has quick charging contactors.

\* \* \* \* \*